United States Patent Office 3,701,685
Patented Oct. 31, 1972

3,701,685
PROCESS FOR A SOLID STATE CELL BY SPRAYING WITH AN ORGANIC SOLVENT
Guy Ervin III, Canoga Park, Calif., assignor to
North American Rockwell Corporation
No Drawing. Filed July 21, 1970, Ser. No. 56,956
Int. Cl. H01m 21/00
U.S. Cl. 136—83 R                                           6 Claims

ABSTRACT OF THE DISCLOSURE

A sprayed-in-place solid state electric cell on a substrate surface, the cell consisting of overlying films of anode, solid electrolyte, and cathode. The cell is formed by successively spraying a silver-containing anode, a silver-ion-conducting solid electrolyte, and a tellurium tetraiodide-complexed cathode, using an inert organic solvent, preferably acetone.

BACKGROUND OF THE INVENTION

This invention relates to sprayed-in-place solid state electrochemical devices and methods for preparing them. It more particularly relates to tnick-film solid state electric cells wherein each of the anode, solid electrolyte, and cathode films is formed by a solvent spray method.

Solid state electric cells utilizing a silver-ion-conducting solid electrolyte are known and are generally advantageous compared with conventional cells and batteries with respect to shelf-life stability, leak-free properties, and flexibility with respect to construction design and miniaturization. Improved solid state cells having a solid electrolyte whose ionic conductivity is greater than that of silver iodide are shown in U.S. Pat. 3,443,997 wherein $$KAg_4I_5, RbAg_4I_5, \text{ and } NH_4Ag_4I_5$$

are utilized as solid electrolyte elements and in U.S. Pat. 3,476,606 wherein organic ammonium silver iodides are utilized as solid electrolyte elements. Such solid state electric cells generally utilize silver as an electron-donor anode material, and a non-metal capable of functioning as an electron acceptor for the cathode material.

For many applications of such solid state cells, it is considered desirable to have a thin-film or thick-film power supply. Such cells could afford a savings in space and weight for portable electronics devices as well as conforming to unusual geometries and restricted spaces. The terms "thin film" and "thick film" are used herein in a relative sense, and have frequently been used in the prior art relating to electrochemical and electronic devices in an interchangeable and confusing manner. The term "thinfilm devices" generally refers to devices formed with one or more deposited films having an overall thickness of less than about 10 microns, such films ordinarily being formed by vacuum-deposition techniques. The term "thick-film devices" is used to refer to solid state devices formed with one or more deposited films having an overall thickness between about 5 and 1000 microns. In the printed-circuit art, such thick films are frequently deposited by silk screen or similar screening processes and are generally between about 10 and 15 microns in thickness. The present invention is principally directed to forming thick-film cells on a substrate surface. The cells formed in accordance with this invention generally approach a lower limit of overall thickness of about 25 microns, and an upper limit of overall thickness of about 1000 microns, but may exceed this depending upon the desired film thicknesses of the individual sprayed-on films.

Various methods are known to the art for depositing thin films of pure silver and of silver iodide on substrate surfaces. However, thin films of complex solid electrolytes cannot be easily prepared by such conventional techniques. Furthermore, the preparation of cathode films for solid state cells has not been heretofore attainable. The electronacceptor materials heretofore utilized in the cathodes of solid state cells have consisted of elemental iodine, alone or in admixture, inorganic alkali metal polyiodides, and organic ammonium polyiodides. See U.S. Pats. Re. 24,408 and 3,476,605. These electronacceptor materials have a significant free iodine vapor pressure, which effectively prevents the successful preparation and utilization of cathode films.

SUMMARY OF THE INVENTION

It is an object of the present invention to provide a thick-film solid state electric cell utilizing an electronacceptor cathode material having no significant iodine vapor pressure. It is a further object to provide a simple, inexpensive, and reliable method for preparing such thickfilm cells.

In accordance with the present invention, there is provided a sprayed-in-place thick-film solid state electric cell on a substrate surface by successively spraying on this surface a silver-containing anode, a silver-ion-conducting solid electrolyte, and a non-metal cathode containing $TeI_4$, alone or in admixed or complexed form as electronacceptor material, using an inert organic solvent. Because of the negligible iodine vapor pressure of the cathode material, once the cell is sprayed in place and suitably encapsulated, it has an almost unlimited shelf life.

DESCRIPTION OF THE PREFERRED EMBODIMENTS

The sprayed-in-place solid state electric cell may be formed on any suitable substrate surface, both conductive and non-conductive. Suitably conductive substrates include tantalum, titanium, and silver. Since silver serves as an electron-donor material, for certain applications using a silver substrate formation of a silver-containing film may be omitted. The solvent containing the silver-ionconducting solid electrolyte is then directly sprayed onto the silver substrate. Suitable insulating substrate surfaces include alumina, glass, quartz, ceramics, and printed-circuit-board components. It is of course immaterial as to whether an anode film is formed in direct contact with the substrate surface or whether the cathode film is first formed thereon, as long as the composite thickfilm sandwich cell consists of anode film, solid electrolyte film, and cathode film in appropriate sequence.

It is considered an essential feature of this invention that the cathode film that is formed contain $TeI_4$, alone or in admixed or complexed form, as electron-acceptor cathode material because of its essentially negligible iodine vapor pressure. These novel electron-acceptor cathode materials are described more fully in copending application S.N. 56,790 of J. H. Christie and J. R. Humphrey, "Cathode Component for Solid State Cell," filed of even date herewith, now U.S. Pat. No. 3,647,549, and assigned to the assignee of this application. As pointed out therein, while $TeI_4$ may be used alone as electron-acceptor material in the cathode composition, it is generally preferred to use it in complexed form. Substantially any material which does not interfere with the electrochemical cell reaction, such as by decomposing the solid electrolyte, may be used to form a mixture or complex with $TeI_4$. The electron-acceptor components of the cathode compositions characterized as complexes of $TeI_4$ may constitute simple mixtures, single-phase solid compounds, or multiphase mixtures of several such compounds. For example, a tetravalent tellurium heterohalide may be utilized, e.g., $TeCl_3I$, and this is regarded as a $TeI_4$ complex, $TeI_4 \cdot 3TeCl_4$, for the purposes of the present invention.

While various considerations relating to physical properties and cost are involved in selecting the complexing material, it is generally preferred to complex the $TeI_4$ with those materials which will form conductive compositions when the electron-acceptor material undergoes reduction during the discharge reaction. Such preferred compounds for forming complexes with $TeI_4$ are represented as MI and QI where M is selected from K, Rb, $NH_4$, Cs, and combinations thereof, Cs being present only as a minor constituent of M, as described in U.S. Pat. 3,443,997; and where Q is a univalent organic ammonium cation having an ionic volume between 30 and 85 cubic angstroms, as described in U.S. Pat. 3,476,606. In its particularly preferred embodiments, the electron-acceptor materials may be represented as $TeI_4 \cdot aMI$ and $TeI_4 \cdot bQI$ where $a$ and $b$ have any values between 0 and 2, inclusive. Such complexes form high-conductivity reaction products when reacting with silver ions during the cell discharge reaction thereby there is little or negligible increase in the internal resistance of the cell during the cell reaction.

In a preferred embodiment of an ionically conductive cell, the anode consists of an intimate mixture of silver, carbon, and solid electrolyte, as described in U.S. Pat. 3,503,810, and the cathode consists of a mixture of electron-acceptor material and carbon, and generally also solid electrolyte. For certain applications, particularly where no solid electrolyte material is included in the cathode composition, it is desirable that the reaction product formed in the cathode during the cell reaction have its conductivity optimized. Such an optimized reaction product may be obtained by utilizing such electron-acceptor cathode components represented by the formulas $TeI_4 \cdot Rb_2TeI_6$, i.e., $TeI_4 \cdot RbI$, and

i.e., $TeI_4 \cdot 0.62(CH_3)_4NI$. These compositions appear to be multiphase mixtures of $TeI_4$ with the solids having the empirical formulas $Rb_2TeI_6(TeI_4 \cdot 2RbI)$ and

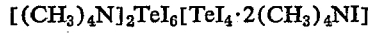

respectively.

The electrochemical cell mechanism and the chemical reactions occurring within a solid state cell are highly complex and but imperfectly understood, and the following explanation should not be construed as limiting the scope of the present invention. During cell discharge, silver ions migrate through the solid silver-ion electrolyte to react with the electron-acceptor material in the cathode to form various reaction products. It is preferred that the reaction products formed during discharge be of relatively high ionic conductivity, i.e., at least greater than that of silver iodide, to avoid an increase in internal cell resistance and in cell polarization. Thus where a silver-containing anode is used, together with a silver-ion-conducting solid electrolyte, then the electron-acceptor cathode component present will preferably be $TeI_4 \cdot aMI$ or $TeI_4 \cdot bQI$, where $a$ and $b$ have any values between 0 and 2, M and Q being as previously defined. Thereby formation of a high resistivity reaction product in the cathode or at the cathode-electrolyte interface and resultant degradation of the cell current is minimized.

Where $a$ and $b$ have values of zero, then the cathode component will be $TeI_4$ alone and the cell reaction will correspond to

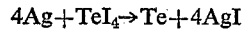

Where it is desired to optimize the conductivity of the reaction product formed by avoiding the formation of any high resistivity, conductivity-diluting materials, then $a$ preferably has a value of 1, particularly at temperatures below 140° C. Such a composition may be represented as $TeI_4 \cdot M_2TeI_6(TeI_4 \cdot MI)$. Thus in a typical cell discharge reaction at a temperature above 27° C.:

a high conductivity material, $RbAg_4I_5$, is formed.

Suitable QI compounds utilized to form the single-phase and multiphase complexes with tellurium tetraiodide are shown in Table 1 of U.S. Pat. 3,476,606. As noted therein, for an organic ammonium electrolyte having the empirical formula $QI \cdot nAgI$, conductivities for values of $n$ of 4, 6, and 8 are given. Where it is desired to have a material of optimum cell conductivity formed at the cathode during the cell discharge reaction, such reaction product is provided where $b$ is selected to give an optimized reaction product corresponding to values of $n$ between 4 and 9 depending on the particular Q component selected. For the tetramethyl ammonium complex $b$ has a value of 8/13 (0.62). Illustratively, this optimized tetramethyl ammonium reaction product is provided by the multiphase mixture $4[(CH_3)_4N]_2TeI_6 \cdot 9TeI_4$, and is believed to be formed in accordance with the following cell discharge reaction:

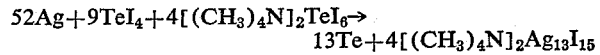

The formed reaction product may also be expressed as $(CH_3)_4NI \cdot 6\frac{1}{2}$ AgI, and represents an optimized conductive composition.

For ease and simplicity in preparing the cathode compositions, and also to provide less costly procedures and components, it is generally preferred that Q be a relatively simple ammonium cation. Illustrative of such preferred ammonium cations are those obtained by the attachment of simple aliphatic substituent groups to the nitrogen atom of the quaternary ammonium cation complex, e.g., $Me_4$, $Me_3Et$, $Me_3Pr$, $Me_3i$-Pr, $Me_2Et_2$, $MeEt_3$, $MeEt_2Pr$, $MeEt_2i$-Pr, $Et_4$, $MeEt_2Bu$, $Et_3Pr$, and $Me_3Ay$, where Me=methyl, Et=ethyl, Pr=propyl, i-Pr=isopropyl, Bu=butyl, and Ay=allyl. Because of their ready availability as starting materials, the lower alkyl groups, particularly methyl and ethyl, are particularly preferred as substituent groups. However, other organic ammonium cations may be utilized for Q, as shown in U.S. Pats. 3,476,605 and 3,476,606.

Tellurium tetraiodide itself may be readily prepared by reaction of tellurium metal with elemental iodine, as is well known in the art. In preparing the various preferred tellurium tetraiodide complexes, $TeI_4$ may be directly reacted in the solid state with the MI or QI component in desired selected proportions. Alternatively, a solid state reaction in a closed vessel may be performed wherein tellurium metal, elemental iodine and the desired MI or QI material are reacted in suitable proportions at an elevated temperature, suitably between 100 and 200° C. to form the desired cathode component. At the same time, carbon and electrolyte material may be optionally and preferably included with the electron acceptor component so as to provide a final cathode composition consisting of a mixture of complexed tellurium tetraiodide component, carbon, and electrolyte material.

While silver alone may be used as anode material, preferably it is intermixed with solid electrolyte material and finely divided conductive carbon. Particularly preferred as silver-ion-conducting solid electrolyte because of their high conductivity are the ionically conductive compositions shown in U.S. Pat. 3,443,997 and U.S. 3,476,606, i.e., the alkali metal silver iodide and organic ammonium silver iodide electrolytes, respectively.

The most advantageous results in the practice of this invention are obtained when both the anode and the cathode films are of composite structure and contain finely divided carbon dispersed therein. Generally a solid electrolyte material is also dispersed in the anode, and optionally in the cathode. Thus for a typical preferred thick-film solid state cell, the anode film consists of an intimate mixture of silver, solid electrolyte material such as $RbAg_4I_5$, and finely divided conductive carbon. In U.S. Pat. 3,503,810 is shown a method of preparing a suitable anode composition. The electrolyte film consists of $RbAg_4I_5$, and the cathode film consists of a mixture of $Rb_2TeI_6$, $RbAg_4I_5$, and carbon.

The relative amounts of carbon, electrolyte and electron-acceptor component, whether using $TeI_4$ alone or in complexed form, are not critical and may be varied over a wide range. Preferred relative amounts of the three components of the cathode blend, on a weight percentage basis, are 20–80 electron-acceptor material, 5–60 carbon, and 0–50 electrolyte material. Preferably the electrolyte material present in the anode and cathode is of the same composition as the material used for the solid electrolyte element.

Within the framework of this invention, the selection of a suitable inert organic solvent for forming the sprayed thick-film cell may be readily accomplished by the application of routine experimental screening procedures using the criteria herein set forth for guidance. It is of course essential that the organic solvent be inert, that is, nonreactive with the material used for the anode, electrolyte, and cathode compositions. The presence of moisture during cell preparation is generally to be avoided because of its ordinarily deteriorating effects on cell performance. Thus the orginic solvent should usually be nonhygroscopic and able to be conveniently dried where required. While good solvent power is desirable, particularly for the non-carbonaceous components, this is not an absolute requirement inasmuch as dispersions and slurries, as well as solutions of the various materials in the solvent may be readily sprayed, provided the materials present are comminuted to a suitable particle size. Since it is preferred that carbon be present in the anode and cathode films, finely suspended carbon-containing dispersions and slurries rather than homogeneous solutions are generally sprayed.

Inasmuch as economic considerations are basic to the commercial utilization of this process, the use of esoteric and expensive solvents will ordinarily be avoided. Thus a preferred group of solvents are those industrial solvents shown in I. Mellan, "Industrial Solvents," 2nd ed., Reinhold Publishing Corp., New York, 1950. Such solvents include hydrocarbons, halogenated hydrocarbons, amines, alcohols, ketones, ethers, and esters. Thus a commercially suitable solvent, i.e., an industrial solvent within the framework of this invention will ordinarily be of relatively high solvent power, inexpensive, readily available, readily recoverable, and have a generally low boiling point and high vapour pressure. Thereby each sprayed film will be able to be readily dried at a rapid rate prior to application of the successive sprayed film. Where preferred, different solvents may be used in conjunction with the forming of the different films, since obviously not all solvents will provide optimum performance with each of the different electrolyte and cathode compositions. Also, where desired, the solutions may be filtered or decanted where undesired precipitates are present.

Commercially available atomizers and air-brush sprayers are conveniently utilized for the spray process. To avoid the presence of moisture, pre-dried nitrogen or helium gas is preferably used to provide the pressure spray, which may be regulated to control the fineness of the mist or spray obtained and the rate of deposition. For various applications, suitable masks, stencils, or screens are interposed between the spray and the surface being sprayed. The solutions, dispersions, and slurries may be prepared in dilute or concentrated form depending on the desired thickness of the dried film, the volatility of the solvent, the solvent power of the solvent, and related considerations. It is generally preferred, consistent with convenient spray requirements, that saturated solutions or dispersions be used.

While, for example, the ketones, ethers, and esters constitute a suitable group of solvents within the framework of this invention, I find the lower alkyl ketones, particularly acetone, to be outstanding for use as inert organic solvent in the practice of this invention. Acetone appears to be particularly suitable in providing film coatings of anode, electrolyte, and cathode that are compact, adherent, visibly uniform, and of reproducible thickness.

Since the alkali metal silver iodides form acetonates with acetone, it was believed that a thin film of solid electrolyte deposited from acetone would crumble when deacetonated. However, it was unexpectedly found that smooth conductive films containing $RbAg_4I_5$ are formed upon deacetonation. It has been found that when $RbI$ and $AgI$ are reacted in acetone, this reaction occurs in the ratio $RbI \cdot 3AgI$. The crystalline solid that initially precipitates out of solution as acetone is removed by distillation is a single-phase solid having the formula $RbAg_3I_4 \cdot 2$ acetone. Where an attempt is made to directly dissolve $RbAg_4I_5$ in acetone, a slurry is formed due to precipitation of excess $AgI$. Where an attempt is made to prepare $RbAg_4I_5$ in situ by dissolving amounts of $AgI$ and $RbI$ in 4:1 ratio in acetone, again excess $AgI$ precipitates. However, when the crystalline acetonate solid is deacetonated by being heated or exposed to air, it undergoes a disproportionation reaction:

$$7RbAg_3I_4 \cdot 2 \text{ acetone} \rightarrow 14 \text{ acetone} + Rb_2AgI_3 + 5RbAgI_6$$

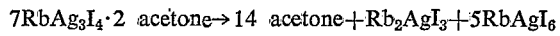

The solid product corresponding to $3AgI \cdot RbI$ that is obtained in this manner is therefore a two-phase composition containing 83.4 mole percent of the highly conducting material ($RbAg_4I_5$) and 16.6 mole percent of the poorly conducting $Rb_2AgI_3$. Somewhat surprisingly, the film that results from reaction of $AgI$ and $RbI$ in acetone and deacetonation of the formed acetonate, while two-phase, is still smooth and adherent and of very high ionic conductivity. Where a film of pure $RbAg_4I_5$ is desired, this may be obtained by dissolving $RbAg_4I_5$ in a pyridine solvent and spraying the resulting solution on a substrate.

The following examples are illustrative of the practice of this invention but should not be construed as limiting with respect to optimization of cell current and voltage, which are also functions of the material selected for the electrodes and electrolyte, cell construction techniques, electrolyte layer thickness, contact resistance between adjacent layers, and other related cell parameters. Optimization of these various cell parameters may be achieved by routine experimentation in accordance with the teachings of this invention and the known art relating to solid state cells.

EXAMPLE 1

Preparation of thin film of $RbAg_4I_5$ $RbAg_4I_5$ (5–6 grams) was dissolved in 30 ml. warm pyridine containing 1 ml. of water. A glass slide was pre-warmed to about 40° C., and the solution was sprayed onto this substrate using an artist's air brush. The thickness of the deposited film was varied by repeated spray applications, the glass slide being warmed briefly after each application. X-ray analysis of the film showed it to be pure $RbAg_4I_5$.

The foregoing procedure was also used to deposit a thin film of the $RbAg_4I_5$ electrolyte on a silver substrate surface.

Using similar procedures, thin films of $KAg_4I_5$ $NH_4Ag_4I_5$

and the quaternary ammonium electrolytes may be prepared.

EXAMPLE 2

Film deposition from acetone solutions

To 1 liter of pre-dried acetone was added 124.3 grams RbI and 415.8 grams AgI corresponding to a molar ratio of $RbI \cdot 3AgI$, the solution being heated with constant stirring. Any precipitated material was allowed to settle, and the clear supernatant was decanted. The final solution contained 36.9 grams electrolyte per 100 ml. of acetone. To different portions of the solution was added about 1 percent by weight of methyl methacrylate resin. These solutions, both with and without the synthetic resin, were sprayed on various substrate surfaces including glass, titanium, tantalum, nickel alloy, pressed zirconium carbide pellet, pressed carbon pellet, silver, and a pressed standard anode pellet consisting of carbon, $RbAg_4I_5$, and silver. In all instances smooth adherent conductive coatings between about 25 and 75 microns in thickness were obtained.

In another series of runs, about 10 percent by weight of carbon was added to the 3:1 AgI–RbI acetone solution and sprayed on glass and titanium substrates using an artist's air brush. Smooth, uniform adherent films were obtained on volatilization of the acetone. The dried carbon-electrolyte coating was then sprayed with the AgI–RbI electrolyte solution in acetone; a second adherent conductive uniform coating was obtained. After this second coating was dried, it was sprayed with the carbon-electrolyte solution in acetone to form a third adherent uniform coating.

EXAMPLE 3

Preparation of sprayed thick film cell

A finely divided intimate mixture containing 2 parts of silver to 1 part of carbon was prepared by the chemical reduction of silver oxalate in the presence of carbon black. An anode spray was prepared by dissolving 5 grams of this silver-carbon mixture in 50 ml. of a solution of electrolyte in acetone prepared as in Example 2. The cathode spray mixture consisted of 300 grams of $$RbI \cdot 3AgI$$

in 750 milliliters of pre-dried acetone to which was added 2 grams of pre-dried carbon black and 2 grams of $$Rb_2TeI_6$$

The electron-acceptor component had been prepared by reacting tellurium dioxide with rubidium iodide in a 1:2 molar ratio in a hydriodic acid solution. All the spray mixtures were made up in a nitrogen-purged dry box, and dried nitrogen gas was used with a commercial air brush. Squares of a high-temperature nickel alloy were sprayed with the cathode mix, and copper squares were sprayed with the anode mix. Dried films were formed by removing the acetone by treatment under vacuum at a temperature below the $RbAg_4I_5$ electrolyte melting point (232° C.). The formed anode and cathode films on the squares were then sprayed with the RbI-AgI electrolyte solution in acetone, and cells were assembled consisting of sequential layers of copper base plate, anode film, electrolyte film, cathode film, and nickel alloy base plate.

A typical experimental cell thus contained as the anode film a mixture of silver, $RbAg_4I_5$, and carbon black; as the electrolyte film $RbAg_4I_5$; and as the cathode film a mixture of $Rb_2TeI_6$, carbon black, and $RbAg_4I_5$. The cell had a thickness of about 635 microns, including the nickel alloy and copper back-up plates, and the electrode cross sectional area was 3.6 cm². This cell had an open circuit voltage of 0.53 volt at room temperature. When discharged at 0.6 milliampere it yielded about 15 minutes of operation to 80 percent of the open circuit voltage. This cell was then recharged and an identical discharge curve was obtained on the second cycle. Tests on other similarly prepared cells yielded flash currents as high as 300 milliamperes.

In a similar manner, a solid state capacitor may be prepared by spraying successive layers of anode, electrolyte, and cathode, the cathode film consisting of only carbon and electrolyte and containing no active electron-acceptor cathode material.

It will of course be understood that many variations may be made with respect to the design and operation of the sprayed-in-place solid state electrochemical devices provided by this invention without departing from the broad inventive concept herein. Thus a solid state cell is formed by successively spraying a silver-containing anode, a silver-ion-conducting solid electrolyte, and a tellurium tetraiodide complexed cathode, using an inert organic solvent, preferably acetone. The thick-film cells provided by this invention are generally further processed by encapsulation in a suitable container or by spraying the edges of the cell with a suitable potting compound such as an epoxy resin to seal the cell against entrance of moisture. Thereby the resultant cells have a substantially unlimited shelf life because of the non-iodine-yielding electron-acceptor component present in the cathode film. Also, where the active electron-acceptor cathode component is omitted from the cathode composition, thick-film solid state capacitors may be formed using the present sprayed-in-place techniques.

Furthermore, the present cells are particularly advantageous for operation at high temperatures compared with cells using polyiodide cathodes in that high temperature operation with such latter cells is limited by the lower melting point of the polyiodide cathodes. For example, continuous operation at temperatures above 100° C. is not ordinarily feasible with many of these polyiodide materials. Furthermore, because of the iodine volatility and the resulting porosity of any formed film and the need to contain evolved iodine, such polyiodide cathodes cannot be utilized to make thick-film solid state cells. The thick-film solid state cells of the present invention containing the non-iodine-yielding tellurium tetraiodide type electron-acceptor material in the cathode are operable to the melting point of $RbAg_4I_5$ (232° C.).

Thus while the principle, preferred construction, and mode of operation of the invention have been explained and what is now considered to represent its best embodiment has been illustrated and described, it should be understood that within the scope of the appended claims the invention may be practiced otherwise than as specifically illustrated and described.

I claim:

1. A method for forming a sprayed-in-place solid state electric cell on a substrate surface which comprises providing a substrate surface, spraying said surface with a silver-containing material in an inert organic solvent, volatilizing said solvent to form a silver-containing anode film, spraying said silver-containing anode film with a silver-ion-conducting solid electrolyte in an inert organic solvent, volatilizing said solvent to form a silver-ion-conducting solid electrolyte film upon said anode film, spraying said solid electrolyte film with a material selected from tellurium tetraiodide and its complexes in an inert organic solvent, and volatilizing said solvent to form a cathode film upon said solid electrolyte film.

2. The method according to claim 1 wherein said organic solvent is acetone.

3. The method according to claim 1 wherein said silver-containing anode material in the organic solvent comprises a mixture of silver, carbon, and solid electrolyte material, the cathode material in the organic solvent comprises a mixture of at least carbon and the electron-acceptor material, and the silver-ion-conducting electrolyte material in the organic solvent comprises a silver-ion electrolyte selected from the class consisting of $MAg_4I_5$ and $QAg_nI_{n+1}$, $n$ having a value between 3 and 39, M representing an alkali metal cation selected from K, Rb, $NH_4$, Cs, and combinations thereof, Cs being present only as a minor constituent of M; and Q representing a univalent organic ammonium cation having an ionic volume between 30 and 85 cubic angstroms.

4. The method according to claim 3 wherein said organic solvent is acetone.

5. The method according to claim 1 wherein said substrate surface is silver and the solid electrolyte film is directly formed thereon.

6. The method according to claim 1 wherein the cathode film is first formed on the substrate surface, the solid electrolyte film is formed on the cathode film, and the anode film is then formed on the solid electrolyte film.

References Cited

UNITED STATES PATENTS

| 3,432,331 | 3/1969 | Brady et al. | 117—104 |
| 3,523,824 | 8/1970 | Powers et al. | 117—217 |

WINSTON A. DOUGLAS, Primary Examiner

C. F. LEFEVOUR, Assistant Examiner

U.S. Cl. X.R.

136—153; 117—217